(12) United States Patent
Downs

(10) Patent No.: US 6,678,056 B2
(45) Date of Patent: Jan. 13, 2004

(54) JAMIN-TYPE INTERFEROMETERS AND COMPONENTS THEREFOR

(75) Inventor: Michael John Downs, 37 Shepherds Way, Liphook, GU30 7HF (GB)

(73) Assignees: Michael John Downs, Liphook (GB); Angela Christine Downs, Liphook (GB)

( * ) Notice: Subject to any disclaimer, the term of this patent is extended or adjusted under 35 U.S.C. 154(b) by 186 days.

(21) Appl. No.: 09/911,567

(22) Filed: Jul. 23, 2001

(65) Prior Publication Data

US 2002/0015153 A1 Feb. 7, 2002

(30) Foreign Application Priority Data

Jul. 27, 2000 (GB) .............................................. 0018304

(51) Int. Cl.$^7$ ......................... G01N 21/41; G01N 21/43; G02B 27/28; G02B 5/30; G02B 17/00; G02B 5/04; G02B 5/08

(52) U.S. Cl. ...................... 356/517; 359/485; 359/732; 359/834; 359/839; 359/857; 359/861

(58) Field of Search ................................ 356/450, 486, 356/487, 492, 493, 496, 498, 517; 359/529, 212, 857, 861, 726, 498, 487, 495, 629, 618, 639, 579, 485, 732, 834, 839

(56) References Cited

U.S. PATENT DOCUMENTS

| | | | | |
|---|---|---|---|---|
| 2,795,991 A | * | 6/1957 | Tuzi ............................ | 356/517 |
| 3,680,963 A | * | 8/1972 | Edwards et al. ............ | 356/517 |
| 3,883,224 A | | 5/1975 | Tanaka ........................ | 350/103 |

(List continued on next page.)

FOREIGN PATENT DOCUMENTS

| | | |
|---|---|---|
| GB | 490237 | 8/1938 |
| GB | 490238 | 8/1938 |
| GB | 494480 | 10/1938 |

(List continued on next page.)

OTHER PUBLICATIONS

"Beam Splitter with 90° Phase Shift for Interference Displacement Measuring Instrument" by Vyskub et al., Moscow Engineering Physics Institute, No. 4, pp. 210–211, Jul.–Aug., 1977.

Primary Examiner—David V. Bruce
Assistant Examiner—Thomas R Artman
(74) Attorney, Agent, or Firm—Sheridan Ross PC

(57) ABSTRACT

A retroreflector has three mutually-orthogonal reflective surfaces arranged around an optical axis. The reflective surfaces stop short of the optical axis to provide a central region of the retroreflector which transmits incident light and a peripheral region of the retroreflector which retroreflects incident light. When the reflector is used in a Jamin-type interferometer with another reflector, this enables the interferometer to be used for measuring displacement between the reflectors.

In the interferometer, a projected beam is disposed between a pair of return beams and/or one of the return beams is disposed between a pair of the projected beams. This enables a first contiguous area of a face of a beam splitter to be provided with a phase-shifting coating to produce a phase quadrature relationship between a pair of interferogram beams. This simplifies the masking required when applying the coating.

In manufacture of the beam splitting member, a thin-film, beam-splitting, metal coating is applied to the member, and the member and coating are baked so as to modify the phase shift produced by the coating to enable the phase quadrature relationship. During baking a beam of light is projected at the coating with an angle of incidence of substantially $\pi/4$ radians so that the beam is split into a transmitted component and a reflected component. The intensities or phases of the transmitted and reflected components are monitored during baking, and the baking is terminated when the monitored intensities or phases have a predetermined relationship. This improves the reliability and/or accuracy of the resulting phase shift.

29 Claims, 12 Drawing Sheets

U.S. PATENT DOCUMENTS

| | | | | |
|---|---|---|---|---|
| 4,171,915 A | * | 10/1979 | Hesselink | 356/517 |
| 4,571,082 A | * | 2/1986 | Downs | 356/491 |
| 4,693,605 A | * | 9/1987 | Sommargren | 356/487 |
| 4,813,783 A | * | 3/1989 | Torge | 356/498 |
| 5,517,308 A | * | 5/1996 | McMurtry | 356/517 |
| 5,546,184 A | * | 8/1996 | Downs | 356/496 |
| 5,914,813 A | | 6/1999 | Smith et al. | 359/529 |
| 6,330,065 B1 | * | 12/2001 | Hill | 356/485 |
| 6,369,951 B1 | * | 4/2002 | Spanner | 359/629 |

FOREIGN PATENT DOCUMENTS

| | | |
|---|---|---|
| GB | 2316766 | 3/1998 |
| WO | WO 93/09394 | 5/1993 |

\* cited by examiner

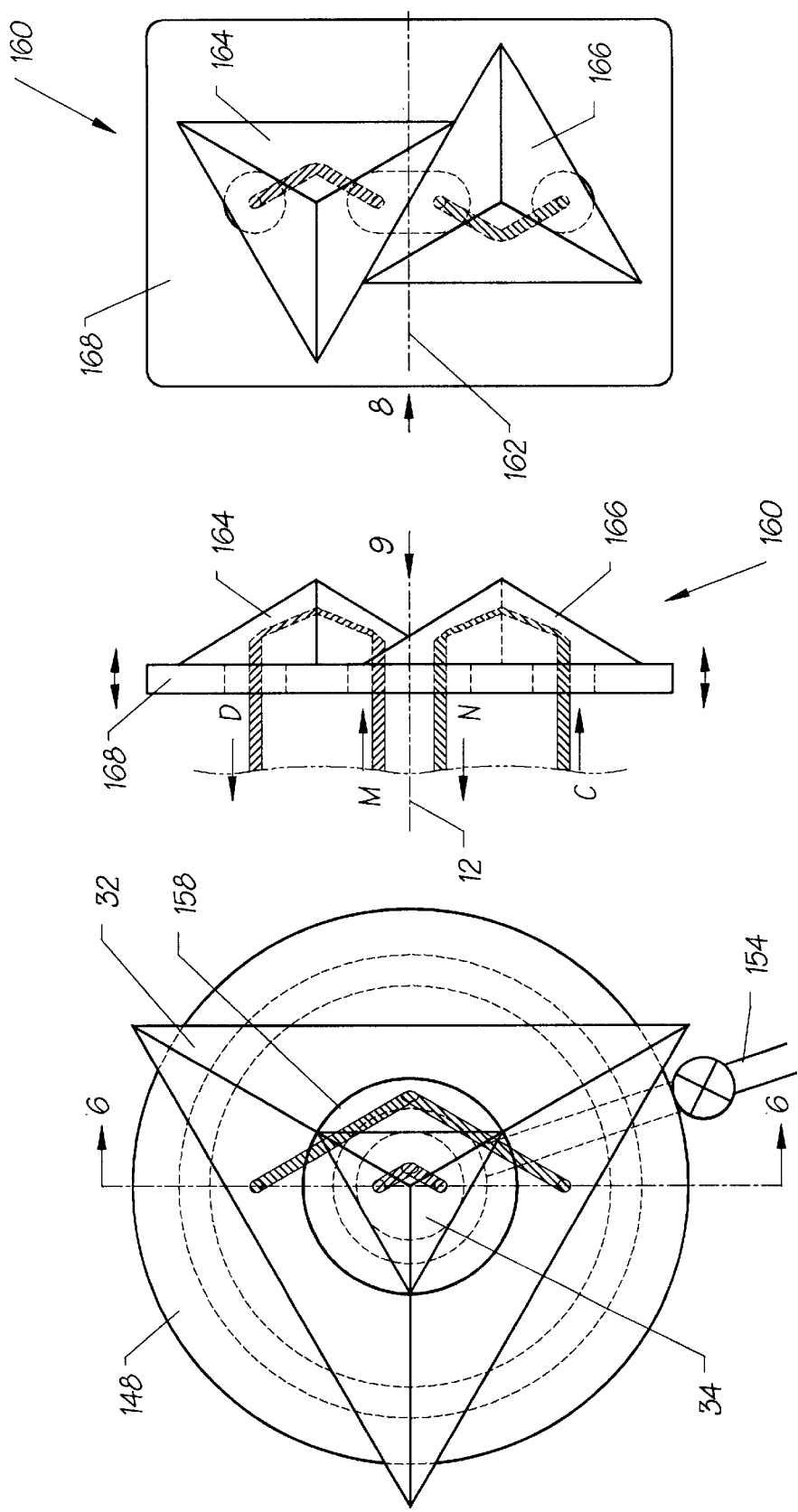

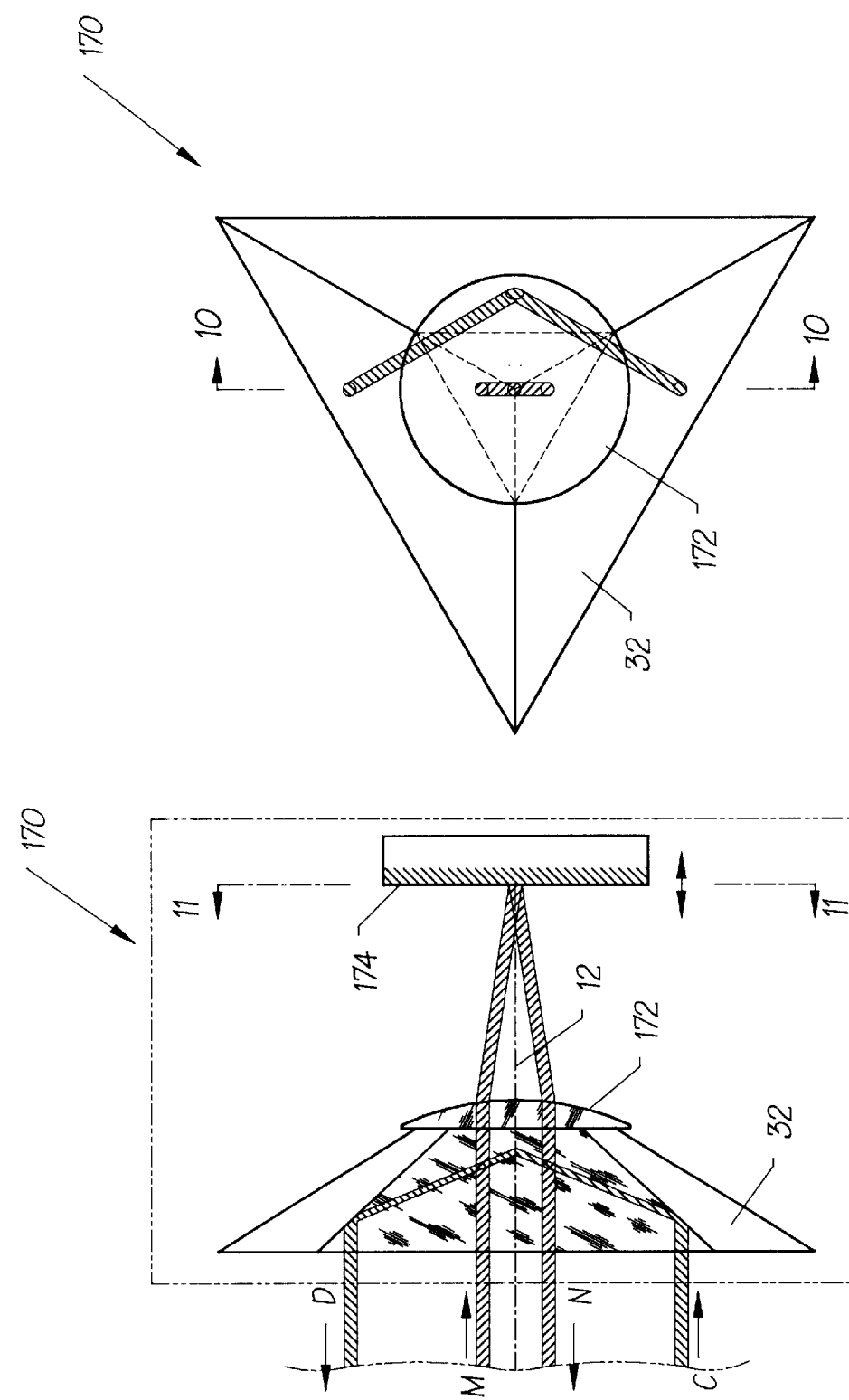

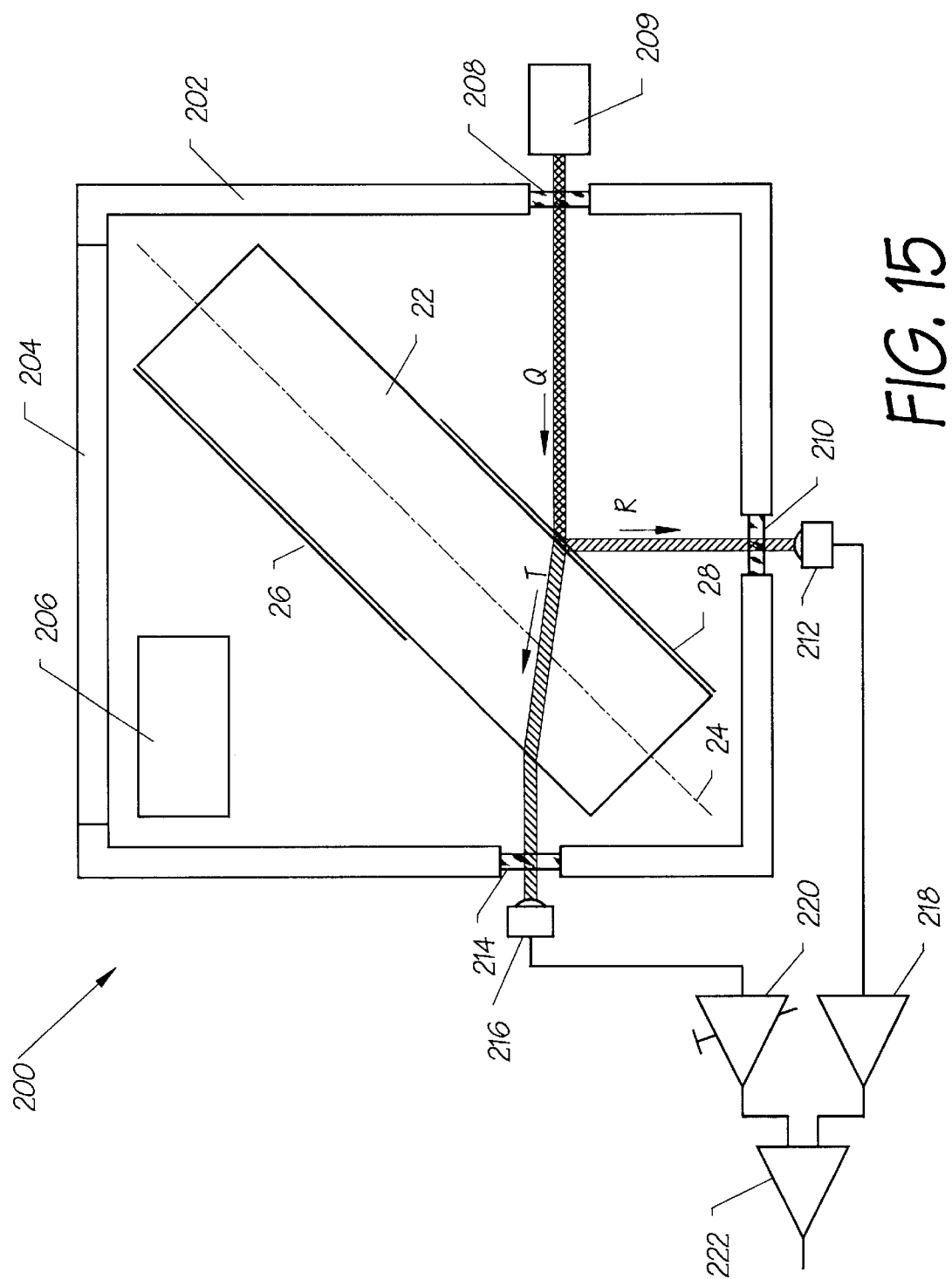

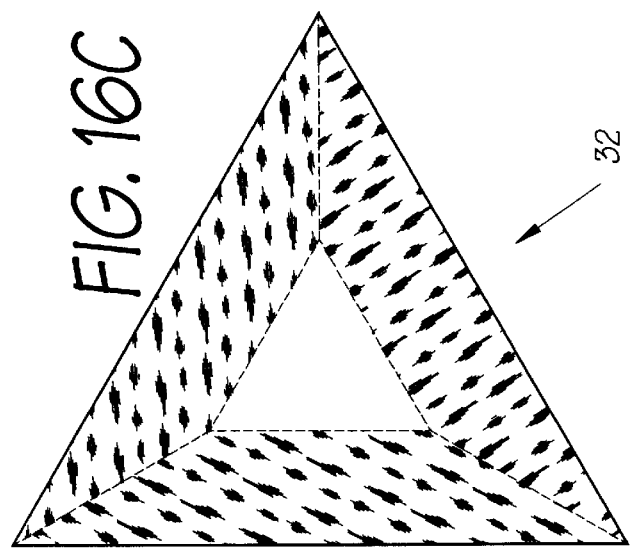
FIG. 16C
FIG. 16E
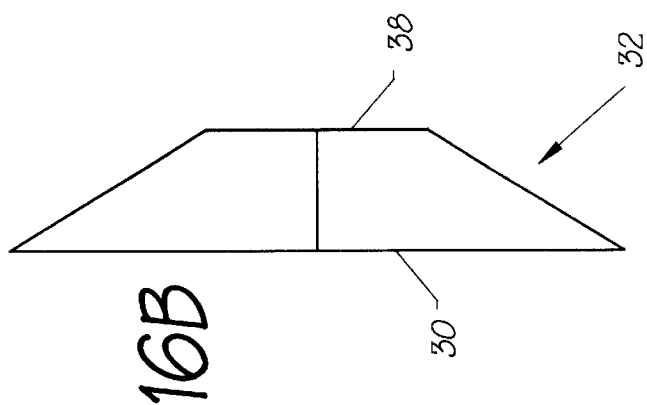
FIG. 16B
FIG. 16D
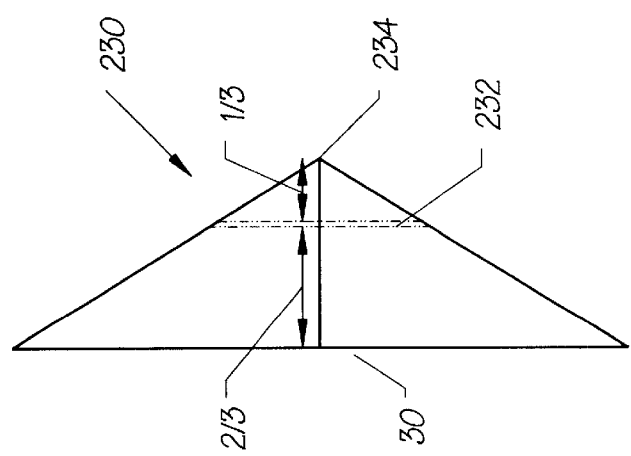
FIG. 16A

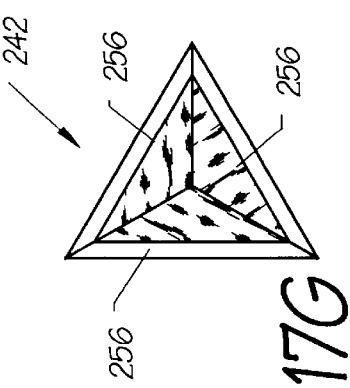
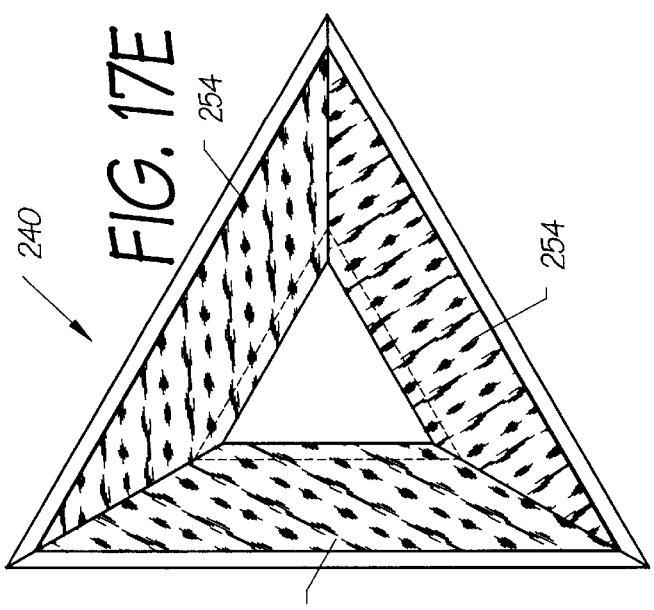
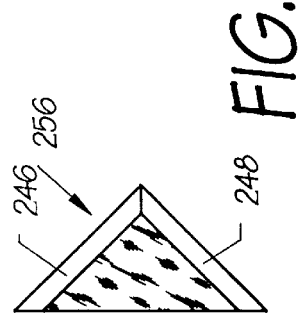
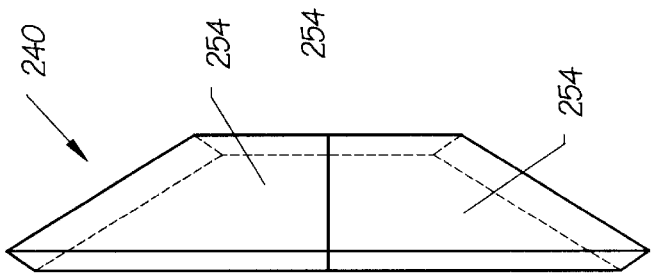
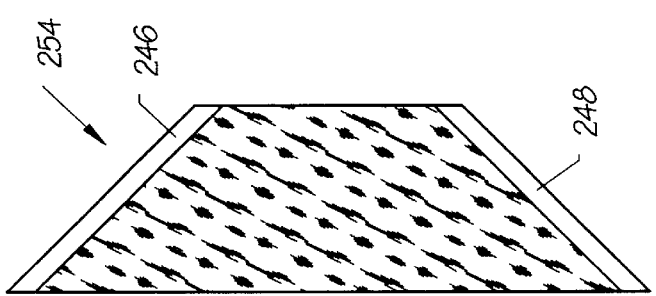
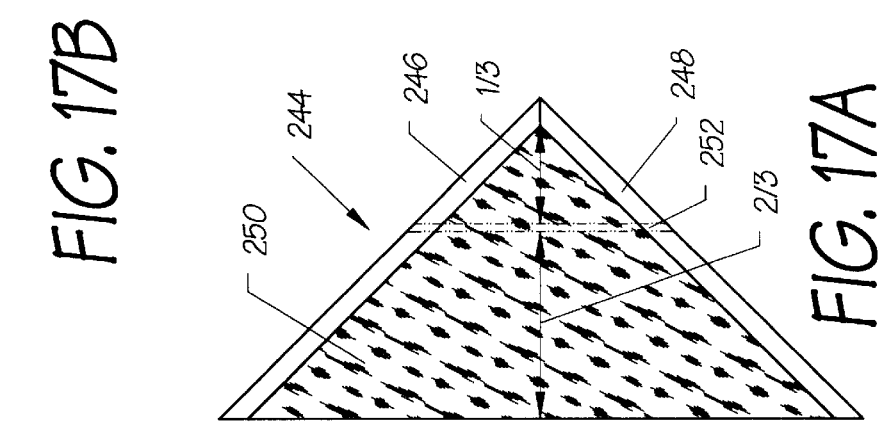

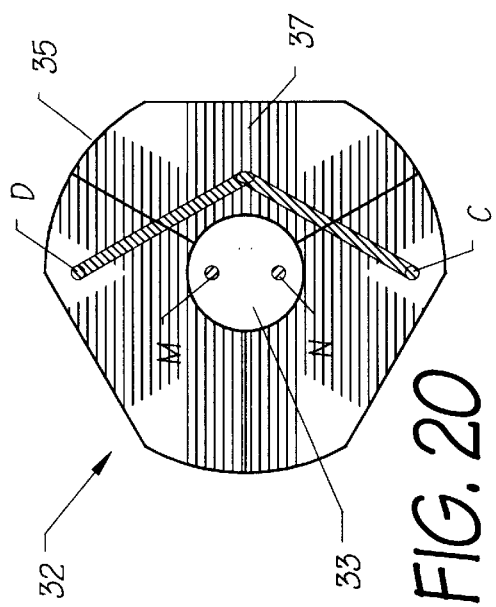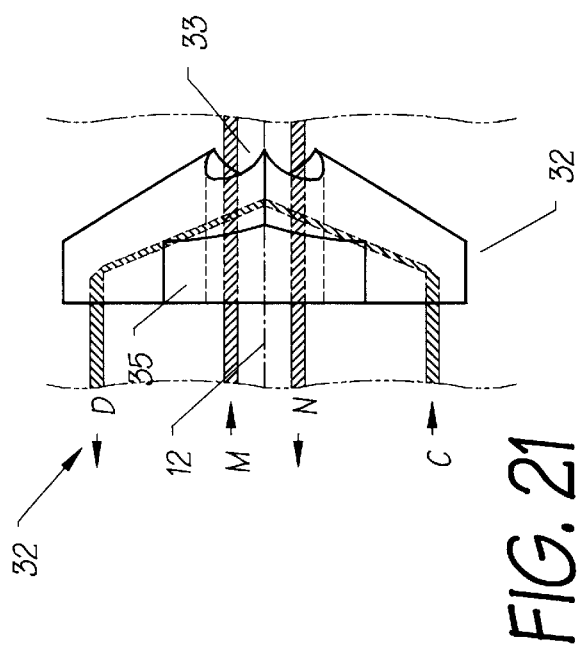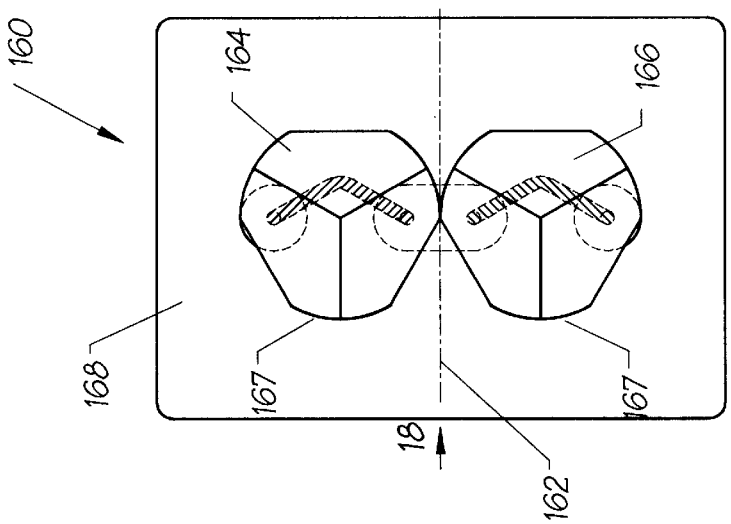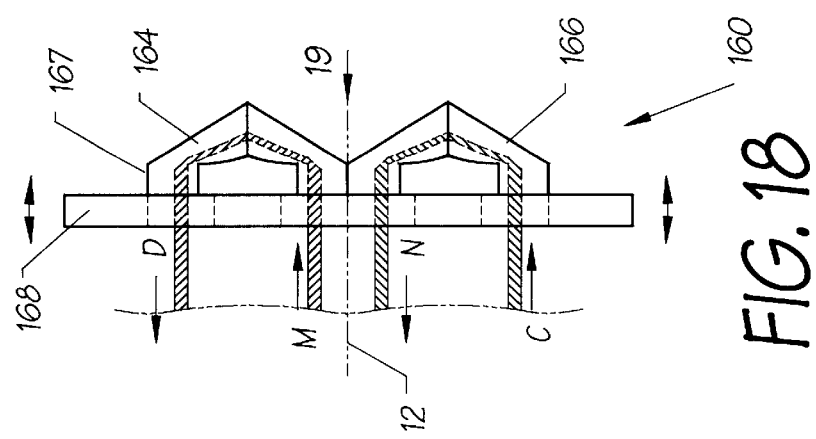

JAMIN-TYPE INTERFEROMETERS AND COMPONENTS THEREFOR

BACKGROUND TO THE INVENTION

1. General Field of the Invention

This invention relates to a retroreflectors, to reflector systems, to optical apparatus, to methods of manufacturing reflector systems, to Jamin-type interferometers, to beam splitting blocks and to methods of manufacturing beam splitting blocks.

2. Particular Fields of the Invention and Description of the Prior Art

A first aspect of the invention relates to a retroreflector, and more particularly to a retroreflector having three mutually-orthogonal reflective surfaces arranged around an optical axis. Such retroreflectors are well known and have applications in, for example, vehicle rear reflectors and interferometers. In a typical Michelson-type interferometer, a reference beam and a measuring beam derived from a common beam are projected at right angles to each other and are then reflected back by respective reflectors; the reflected beams are superposed to form an interferogram. By contrast, in a typical Jamin-type interferometer (see, e.g., FIGS. 1 and 3 of patent document US-A-4571082 and FIGS. 16a,b of patent document US-A-5546184), a reference beam and a measuring beam derived from a common beam are projected parallel to each other, but spaced apart, and then back by a single reflector; again, the reflected beams are superposed to form an interferogram. Retroreflectors can usefully be used in such interferometers so that parallelism of the reflected and projected beams can be assured and so that the reflected beam can be offset from the projected beam. However, the use of a single conventional retroreflector for both the reflected and projected beams in a Jamin-type interferometer limits the applications of the interferometer.

A second aspect of the invention relates to a reflector system comprising first and second relatively movable reflectors.

A third aspect of the invention relates to an optical apparatus having an optical axis and a retroreflector.

Fourth and fifth aspects of the invention relates to a method of manufacturing a reflector or reflector system.

Sixth, seventh and eighth aspects of the invention relates to Jamin-type interferometers.

The Michelson-type interferometer mentioned above typically employs polarisation techniques to advantage, but consequently suffers from the disadvantage of the need to align the polarisation directions of the light beam source and polarisation-affecting components in the interferometer. By contrast a Jamin-type interferometer as described above typically does not use polarisation techniques and so does not suffer from the polarisation alignment problem. Indeed, alignment generally of a Jamin-type interferometer is less problematic than a Michelson-type interferometer. A further disadvantage of the typical conventional Jamin-type interferometer is that, because the reference and measuring beams share a common general path and a common reflector, there has been no widespread use of Jamin-type interferometers for displacement measurement— the Jamin-type interferometer of US-A4571082, for example, is limited to use in conjunction with a refractometer to measure refractive index rather than displacement and the Jamin-type interferometers of US-A5546184 either are for use with a refractometer or employ a complex reflector arrangement to measure displacement.

The Jamin-type interferometer of the eighth aspect of the invention is concerned with the problem in the type of interferometer shown in FIG. 16a of US-A-5546184 that it is necessary to provide two separate phase-shifting means (the phase-shifting films 135,137 in US-A-5546184) in order to obtain a pair of interferogram beams in approximate phase quadrature.

The seventh and eighth aspects of the invention are concerned more particularly with a Jamin-type interferometer wherein: a beam splitter is arranged to split an incident beam of light into first and second generally-parallel, spaced-apart, projected beams; a reflector system is arranged to reflect the first and second projected beams to produce first and second return beams, respectively, which are spaced apart from and generally parallel to each other and the first and second projected beams; and the beam splitter is arranged to enable the first and second return beams to be superposed to produce at least one interferogram.

The ninth aspect of the invention relates to a method of manufacture of a beam splitting member, comprising the steps of: applying a thin-film, beam-splitting, metal coating to at least part of a surface of the member; and baking the member and coating so as to modify the phase shift produced by the coating.

Such a method is described in Vyskub VG, et al, 1977, *Pribory i Tekhnika Éksperimenta*, (Moscow Engineering Physics Institute), No 4, pp 210–211. That paper explains that members and coatings had been baked to achieve phase shifts of 90±3°.

SUMMARY OF THE INVENTION

An aim of the first aspect of the present invention is to provide a retroreflector which may increase the applications of a Jamin-type interferometer and which may have other uses.

The retroreflector of the first aspect of the invention is characterised in that the reflective surfaces stop short of the optical axis to provide a central region of the retroreflector which transmits incident light and a peripheral region of the retroreflector which retroreflects incident light. Accordingly, the retroreflector can retroreflect a beam which is incident on the peripheral region (with an offset between the incident beam and the parallel return beam), but can pass a beam which is incident on the central region.

In a first embodiment of the first aspect of the invention, the retroreflector may comprise a body of optical material which provides the reflective surfaces by internal reflection in the body. In this case, the retroreflector is preferably and conveniently in the form of a solid cube corner having a first transmitting surface for incident light and a second transmitting surface which truncates the cube corner. In this case, the first and second transmitting surfaces may be exactly parallel, but for some applications are preferably generally, but not exactly, parallel, so as to reduce the effects of stray reflections. Alternatively, the retroreflector may be in the form of a solid cube corner having a passageway extending therethrough generally in the direction of the optical axis to provide the central region.

In a second embodiment of the first aspect of the invention, the retroreflector may comprise three plane mirror elements arranged around the optical axis, each providing a respective one of the reflective surfaces. In this case, the retroreflector is preferably in the form of a hollow truncated cube corner.

The reflector system of the second aspect of the invention is characterised in that: the first reflector is a retroreflector according to the first aspect of the invention; and the reflectors are arranged so that light which is transmitted through the central region of the first reflector is reflected by the second reflector and transmitted back through the central region of the first reflector. When used as a reflector system for a Jamain-type interferometer, the enables to interferometer to be used to measure relative movement of the reflectors.

In a first embodiment of the second aspect of the invention, the second reflector is a retroreflector. In this case, the second reflector preferably has three mutually-orthogonal reflective surfaces arranged around a second optical axis, in which case each of the reflective surfaces of the second reflector is preferably arranged parallel to a respective one of the reflective surfaces of the first reflector. The second reflector may comprise a second body of optical material which provides the reflective surfaces by internal reflection in the second body, and in this case the second body may have a transmitting surface for incident light which may be exactly parallel, but for some applications is preferably generally, but not exactly, parallel, to the second transmitting surface of the first reflector, so as to reduce the effects of stray reflections. Alternatively, the second reflector may comprise three plane mirror elements arranged around the second optical axis.

The first and second reflectors may be joined by a piezo electric material, which can be used to vary the spacing between the reflectors.

In a second embodiment of the second aspect of the invention, the second reflector comprises a plane mirror, the system further including a lens between the first and second reflectors.

In a third embodiment of the second aspect of the invention, the second reflector may comprise a polarising beam splitter, quarter-wave plate, plane mirror and second retroreflector arranged such that: light which is transmitted through the central region of the first reflector is transmitted through the beam splitter and quarter-wave retardation plate to the mirror; the light which is thus reflected by the mirror is transmitted through the quarter-wave plate, is reflected by the beam splitter, and is directed to the second retroreflector; the light which is thus reflected by the retroreflector is reflected by the beam splitter and transmitted through the quarter-wave plate to the mirror; and the light which is thus reflected by the mirror is transmitted through the quarter-wave plate, the beam splitter and the central region of the first reflector. Such an arrangement of the second reflector *per se* is known from FIG. 17 of US-A-5546184.

The apparatus of the third aspect of the invention is characterised in that: the retroreflector is arranged according to the first embodiment of the first aspect of the invention; and the first transmitting surface is generally, but not exactly, orthogonal to the optical axis of the apparatus, so as to reduce the effects of stray reflections.

The method of the fourth aspect of the invention is characterised by the step of cutting a cube corner retroreflector in a plane generally orthogonal to its optical axis, or forming a passageway through a solid cube corner generally in the direction of the optical axis of the cube corner.

The method of the fifth aspect of the invention is characterised by the steps of: providing three mirrors each having a pair of mutually orthogonal edges; cutting each mirror along a line intersecting the mutually orthogonal edges to form a first mirror and a second mirror; assembling the first mirrors mutually-orthogonally to form the first reflector.

The method may also include the step of assembling the second mirrors mutuallyorthogonally to form the second reflector.

The Jamin-type interferometer of the sixth aspect of the invention is characterised by a reflector system according to the second aspect of the invention. This therefore opens up a new range of applications for the Jamin-type interferometer, including the measurement of displacement of the two reflectors of the reflector system relative to each other, whilst retaining the advantages of the conventional Jamin-type interferometer and avoiding the disadvantages of the conventional Michelson-type interferometer.

The Jamin-type interferometer of the seventh aspect of the invention is characterised in that the reflector system is in accordance with the second aspect of the invention.

The Jamin-type interferometer of the eighth aspect of the invention is characterised in that: one of the projected beams is disposed between the return beams and/or one of the return beams is disposed between the projected beams. The enables a single phase-shifting means to be employed to produce a required phase shift in two of the beams.

Preferably, a first contiguous area of the face of the beam splitter is provided with a phase-shifting coating, one of the projected beams being projected from, and one of the return beams returning to, the first area. The masking which may be required for depositing of the coating is therefore simplified as compared with the case of US-A-5546184 wherein two separate areas of coating need to be applied.

Preferably, the coating produces a phase shift such that there is a phase difference of substantially $\pi/2$ radians between the two interferogram beams, and preferably the coating comprises a thin metal film.

Preferably, a second contiguous area of the face of the beam splitter is devoid of any coating providing any substantial phase-shift, the other projected beam being projected from, and the other return beam returning to, the second area.

Preferably, the interferometer employs a reflector system according to the second aspect of the invention.

The interferometers of the seventh and eighth aspects of the invention may be provided in combination with a dual-chamber gas or liquid refractometer arranged so that the first projected and return beams pass through one chamber of the refractometer and the second projected and return beams pass through the other chamber of the refractometer.

In the interferometers of the seventh and eighth aspects of the invention, the reflector system may comprise first and second retroreflectors rigidly joined together adjacent each other, the first retroreflector being arranged to retroreflect the first projected beam to produce the first return beam, and the second retroreflector being arranged to retroreflect the second projected beam to produce the second return beam. The interferogram(s) may therefore be used to measure changes in the inclination of the reflector system, so that an autocollimator function can be provided.

The interferometers of the seventh and eighth aspects of the invention may further include means for modulating the optical path length of one of the beams, or one of the projected beams and its respective return beam. As will be described in more detail below, such modulation can be used in calibration of the detection of the interferogram beams. In a first embodiment of these aspects of the invention, the modulating means comprises an optically-transmitting, varying-thickness plate disposed in the path of the beam(s) to be modulated, and means for rotating the plate. In a second embodiment of these aspects of the invention, the modulating means comprises a layer of optically-transmitting, flexible material sandwiched between a pair of optically-transmitting plates disposed in the path of the beam(s) to be modulated, and means for modulating the spacing of the plates. In these cases, the modulating means may be disposed adjacent the beam splitter, for example as parts of a head unit of the interferometer.

In the case where the reflector system is provided by the first embodiment of the second aspect of the invention and the first and second reflectors are joined by a piezo electric material as described above, the modulating means preferably includes means for modulating the thickness of the piezo electric material to modulate the spacing between the reflectors.

The aim of the ninth aspect of the invention is to improve the reliability and/or accuracy of the resulting phase shift.

The method of the ninth aspect of the invention is characterised by the steps of: projecting a beam of light at the coating with an angle of incidence of substantially $\pi/4$ radians so that the beam is split into a transmitted component and a reflected component; monitoring the intensities or phases of the transmitted and reflected components during the baking step; and terminating the baking step when the monitored intensities or phases have a predetermined relationship.

It has been discovered that if the intensities of the reflected and transmitted components are equal, the phase shift is such as to produce a phase difference of $\pi/2$ radians between the interferogram beams. Therefore, for convenience, preferably it is the intensities which are monitored. The baking step may be terminated when the monitored intensities are generally equal. Alternatively, in the case where the intensity of the transmitted component is monitored after transmission through another surface of the member, the baking step is preferably terminated when the monitored intensity of the transmitted component is substantially equal to a predetermined proportion of the monitored intensity of the reflected component. This can therefore take account of the transmittance at the other surface of the block.

Preferably, the coating is of aluminium. Preferably, the baking temperature is between 450 and 480° C. Preferably, the intensities of the polarisation components of the projected beam in the perpendicular and parallel directions relative to the plane of the incident light are generally equal to each other.

In accordance with the tenth aspect of the invention, there is provided a beam splitting block produced by a method of the ninth aspect of the invention.

In accordance with the eleventh aspect of the invention, there is provided an interferometer of the seventh or eighth aspect of the invention, wherein the beam splitter is provided by a beam splitting block of the tenth aspect of the invention.

BRIEF DESCRIPTION OF THE DRAWINGS

FIG. 7 is an end view of the second type of reflector/modulator module and refractometer module, as viewed in the direction of the arrow 7 in FIG. 6;

FIG. 8 is a side view of a third type of reflector module for use with the head module of FIG. 1, as viewed in the direction of the arrow 8 in FIG. 9;

FIG. 9 is an end view of the third type of reflector module, as viewed in the direction of the arrow 9 shown in FIG. 8;

FIG. 10 is a side view of a fourth type of reflector module for use with the head module of FIG. 1, sectioned along the line 10—10 shown in FIG. 11;

FIG. 11 is an end view of part of the fourth type of reflector module, as viewed in the direction of the arrows 11—11 shown in FIG. 10;

FIG. 15 is a schematic plan view of an apparatus for use in manufacture of a beam splitting block used in the head module of FIG. 1;

FIGS. 16A–E illustrate a method of construction of the first type of reflector module, FIGS. 16A,B,D being side views, and FIGS. 16C,E being end views;

FIGS. 17A–G illustrate a method of construction of a seventh type of reflector module, FIGS. 17A–C being face views of a components of the module, FIGS. 17D,F being side views, and FIGS. 17E,G being end views;

FIGS. 18, 19 are similar to FIGS. 8 and 9, respectively, but showing a modification to the third type of reflector module;

FIG. 20 is a rear view of an eighth type of reflector module; and

FIG. 21 is a side view of the reflector module of FIG. 20.

DETAILED DESCRIPTION OF THE PREFERRED EMBODIMENTS

Figure 1:
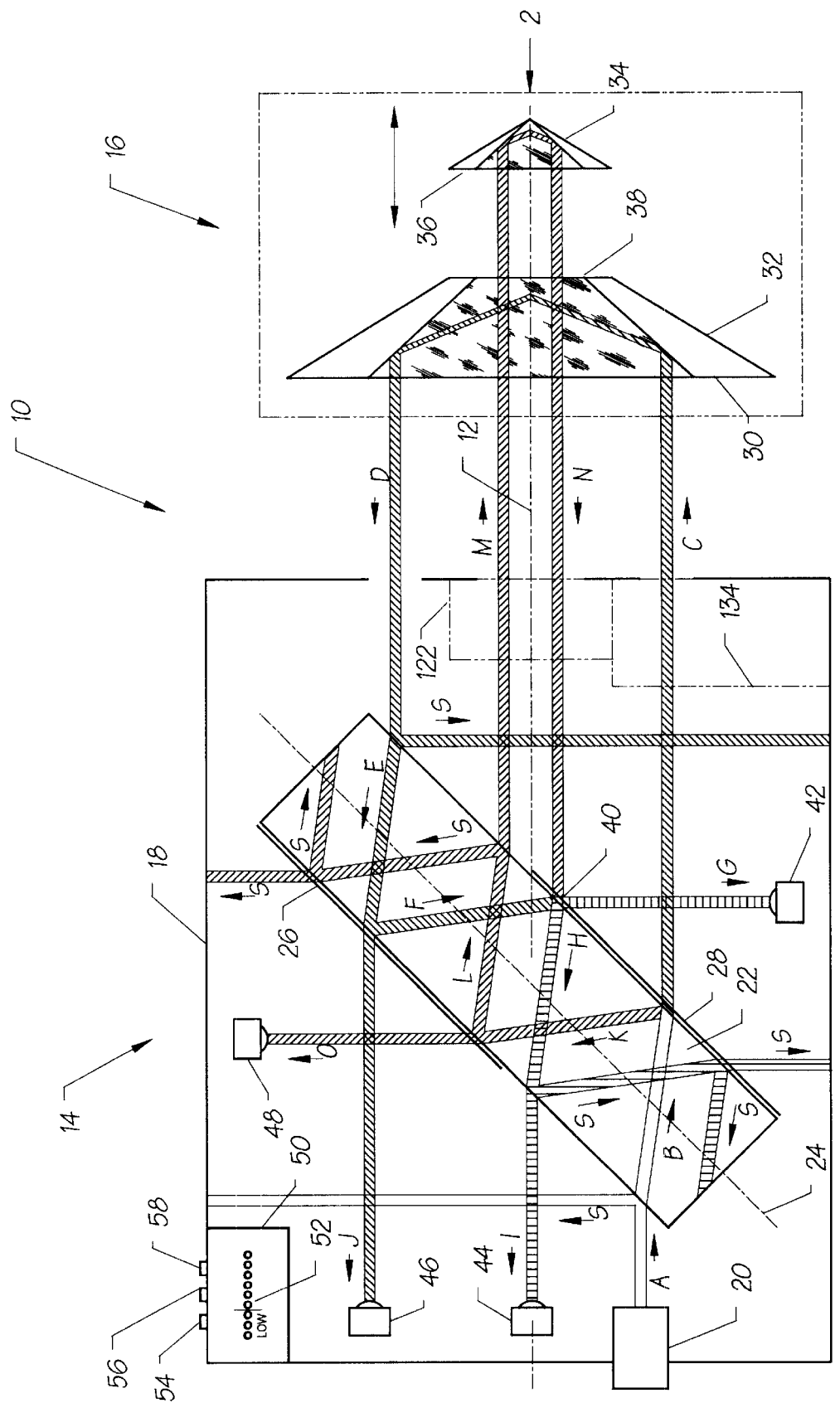
FIG. 1 is a plan view of an embodiment of interferometer having a head module and a first type of reflector arrangement sectioned as indicated by the section line 1—1 in FIG. 2.

When a Jamin-type beam splitting block (as will be described in detail below) is employed in an interferometer, the projected reference beam and the projected measurement beam of the interferometer are automatically aligned in a common direction with a predetermined spacing between the beams, and the reference reflector and measurement reflector are in a single "arm" of the instrument. This optical configuration has the inherent fundamental advantage of "common-path" measurement characteristics and can provide the fundamental advantage of "zero dead path" measurement characteristics.

When cube corner type retroreflectors (as will be described in detail below) are employed for reflecting the projected reference and measurement beams, the reflected reference and measurement beams are also automatically aligned in the same common direction, although spaced from the projected beams. The only alignments which the user needs to make for the system to function are therefore to position each retroreflector so that its reflected beam is generally coplanar with both projected beams and so that its reflected beam is appropriately spaced from its projected beam, whereupon the two reflected beams can be superposed to form an interferogram falling on a photodetector. In other words, each retroreflector needs to be aligned so that its reflected beam returns to within a predetermined area on the beam splitting block.

Optimum interferogram contrast is realised when the two reflected beams are completely superposed by the beam splitting block and fall completely on the photodetector. Typically, photodetectors have an acceptance aperture of 4 to 4½mm and the diameters of the laser beams (if no additional collimating optics are employed) are between 1½mm for a short range system and 3 mm for a one meter range. As will be described in detail below, interferogram contrast can be displayed to the user. In this case, therefore, alignment merely involves coarsely aligning each retroreflector so that its return beam of 1½ to 3 mm diameter falls anywhere within a predetermined area of 4 to 4½mm diameter on the beam splitting block, and then finely aligning just one of the retroreflectors so that maximum contrast is indicated on the display.

When the two cube corner type retroreflectors are pre-aligned (as will be described in detail below with reference to FIGS. 6 to 9, 13, 14, 18 and 19), the retroreflectors merely need to be coarsely aligned by the user so that one of the reflected beams returns to within its predetermined area on the beam splitting block (i.e. a 1½ to 3 mm diameter beam falling anywhere within a predetermined 4 to 4½mm diameter area in the example just described). The other reflected beam will then automatically return to its predetermined area on the beam splitting block, and moreover the retroreflectors will automatically be finely aligned relative to each other.

The interferometer system which will now be described in detail utilises a Jamin-type beam splitting block and can meet the requirements of a range of different interferometric metrology applications by employing an appropriate reflector module/arrangement in conjunction with an interferometer head module.

Referring to FIG. 1, the interferometer 10 has a longitudinal axis 12, with a head module 14 and a target reflector arrangement 16 both lying on the longitudinal axis 12. The head module 14 comprises a chassis/housing 18 on which a frequency-stabilised or non-frequency-stabilised helium neon laser 20 is releasably mounted with a V-block assembly (not shown). The laser 20 projects a highly-collimated laser beam A having a nominal wavelength λ=632.8 nm in a direction parallel to the longitudinal axis 12. Typically, the power of the laser beam A would be 1 to 3 mW and its diameter would be 1 mm. The laser beam A may be unpolarised, but is preferably polarised merely because polarised lasers are generally less noisy than unpolarised lasers. A rectangular beam splitting block 22 of silica or BK7 glass is mounted on the chassis/housing 18 with its longitudinal axis 24 at 45° to the longitudinal axis 12 of the interferometer 10. The longitudinal sides of the beam splitting block 22 are substantially perfectly parallel. From the upper apex of the beam splitting block 22, about 60% (depending upon the spacing of the beams) of the upper longitudinal side of the block 22 is coated with a beam splitting coating 26 (to be described in detail below). The coating 26 causes the transmitted portion and the reflected portion of an incident beam to have generally equal intensities. Half-turn symmetrically, from the lower apex of the beam splitting block 22, about 60% of the lower longitudinal side of the block 22 is coated with a similar beam splitting coating 28.

Figure 2:
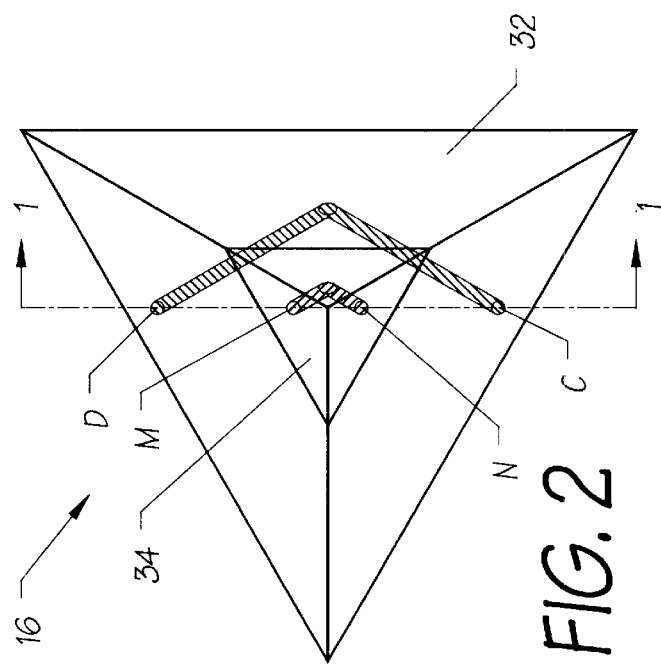
FIG. 2 is an end view of the reflector arrangement of FIG. 1, as viewed in the direction indicated by the arrow 2 in FIG. 1.

Referring to FIGS. 1 and 2, the target reflector arrangement 16 comprises a cube corner retroreflector of silica or BK7 glass which has been cut generally parallel to its equilateral-triangular face 30 so as to form a first, truncated, cube corner retroreflector 32 and a second, smaller cube corner retroreflector 34. The face 30 of the truncated retroreflector 32 and the cut face 36 of the smaller retroreflector 34 are both arranged generally normally to the longitudinal axis 12 of the interferometer 10. However, being retroreflectors, the angle is not critical. Although the cut face 38 of the truncated retroreflector 32 is generally parallel to its front face 30, preferably there is a small inclination between these two faces 30,38 in order to prevent interference by stray reflections. Alternatively, the face 38 may be anti-reflection coated. In one application of the interferometer 10, the truncated retroreflector 32 would be a fixed reference retroreflector, and the smaller retroreflector 34 would be movable. The front faces 30,36 of the two reflectors 32,34 are anti-reflection coated.

Referring back to the head module 14, a signal processing circuit 50 (shown in greater detail in FIG. 3) is included which receives signals from photodetectors 42,44,46,48 and produces a sine output 54, a cosine output 56 and a laser intensity output 58. Typically, the photodetectors 42,44,46, 48 would have an aperture of 4.5 mm. The circuit 50 also provides a contrast display 52 for example in the form of an LED bargraph to assist in aligning the head module 14 and reflector arrangement 16.

The beam A from the laser 20 is projected onto the upper longitudinal side of the beam splitter block 22 near its lower end and is transmitted and refracted so as to diverge downwardly from the longitudinal axis 12 as beam B. Upon reaching the opposite side of the block 22, the beam B is split into two beams C,K. Beam C is the transmitted beam which is refracted and exits the block 22 and is projected parallel to the longitudinal axis 12 to the target reflector arrangement 16. The target reflector arrangement 16 is configured so that the beam C falls on a lower portion of the face 30 of the truncated retroreflector 32 and, after three internal reflections, exits from an upper portion of the face 30 of the truncated retroreflector 32 as beam D. Beam D extends in a return direction parallel to the longitudinal axis 12. Upon return to the head module 18, the beam D falls onto the lower longitudinal side of the beam splitter block 22 near its upper end where the coating 28 is absent and is transmitted and refracted so as to diverge upwardly from the longitudinal axis 12 as beam E. Beam E upon reaching the opposite, upper side of the block 22, is split into two beams F,J. Beam F is the internally reflected beam which is reflected downwardly back to a point 40 on the lower side of the block 22 about half way along its length where the coating 28 is present. At point 40, the beam F is split into two beams G,H. Beam G is the transmitted beam which is refracted and exits the block 22 and is projected orthogonally to the longitudinal axis 12 to a first interferogram photodetector 42 mounted on the chassis/housing 18. Beam H is the internally reflected beam which is reflected and passes to the uncoated portion of the upper side of the block 22 where it is transmitted and refracted so as to be directed, as Beam I, in a direction parallel to the longitudinal axis 12 to a second interferogram photodetector 44 mounted on the chassis/housing 18. Beam J mentioned above is the portion of beam E which is transmitted through the coating 26 and is refracted so as to extend in a direction parallel to the longitudinal axis 12 to a DC reference photodetector 46 mounted on the chassis/housing 18.

Beam K mentioned above is the internally reflected part of beam B. Beam K travels upwardly to a point about half way along the upper side of the block 22 where the block is coated. Beam K is then split into a transmitted beam O and internally reflected beam L. The beam O is transmitted and refracted so that it extends in a direction orthogonal to the longitudinal axis 12 to a laser intensity photodetector 48. The beam L returns back across the block 22 to an uncoated point on the lower side of the block 22, where it is transmitted and refracted so as to form a beam M extending in a direction parallel to the longitudinal axis 12 between the beams C,D and closer to the beam D. The beam M is transmitted straight through the truncated retroreflector 32, exiting from an upper portion of the cut face 38 of the retroreflector 32 and passing to an upper portion of the cut face 36 of the smaller retroreflector 34. After three internal reflections, the beam exits from a lower portion of the face 36 of the smaller retroreflector 34 as beam N. Beam N extends in a return direction parallel to the longitudinal axis 12, entering a lower portion of the cut face 38 of the truncated retroreflector 32 and passing straight through the retroreflector 32. Due to the geometry of the interferometer 10, upon return to the head module 18, the beam N falls onto the lower longitudinal side of the beam splitter block 22 at coated point 40, where the beam N is split. The part of the beam N which is externally reflected at point 40 is superposed with the part of the beam F which is transmitted at point 40 so as to form the interferogram beam G. On the other hand, the part of the beam N which is transmitted at point 40 is superposed with the part of the beam F which is internally reflected at point 40 so as to form the beam H and thence the interferogram beam I.

In addition to beams A to O, FIG. 1 also shows a number of stray beams S caused by unwanted reflections at the block 22. It will be noted that none of the stray beams interferes with the beams A to O or falls on any of the photodetectors 42,44,46,48. The intensities of the stray beams S can be reduced by suitable anti-reflection coatings and reflection at the ends of the block 22 can be prevented by providing ground surfaces at the ends of the block 22.

It should be noted that there are two paths from the laser 20 to the first interferogram photodetector 42: one which is reflected by the truncated retroreflector 32 (beams A,B,C,D,E,F,G); and the other which is reflected by the smaller retroreflector 34 (beams A,B,K,L,M,N,G). Similarly, there are two paths from the laser 20 to the second interferogram photodetector 44: one which is reflected by the truncated retroreflector 32 (beams A,B,C,D,E,F,H,I); and the other which is reflected by the smaller retroreflector 34 (beams A,B,K,L,M,N,H,I). It will be appreciated by those skilled in the art of interferometry that the beam G is indeed an interferogram exhibiting successive bright and dark fringes due to constructive and destructive superposition as the smaller retroreflector 34 is moved relative to the truncated retroreflector 32 along the longitudinal axis 12. One cycle from bright to dark to bright fringe is caused by movement of the smaller retroreflector 34 of $\lambda/2=316.4$ nm. Similarly, the beam I is also an interferogram. The intensity of each interferogram beam G,I varies sinusoidally with changes in the path difference.

If the apparatus described above did not involve any energy loss, then the principles of the conservation of energy impose a phase difference of $\pi$ radians between the energy in the interferogram beams G,I. However, in order to count the fringes produced by path length differences satisfactorily and unambiguously, ideally this phase difference should be $\pi/2$ radians, rather than $\pi$ radians. Alteration of the phase difference between the two interferogram beams is realised by employing the energy-absorbing coating 28 on the beam splitter block 22. It will be appreciated by those skilled in interferometry that by employing the beam splitting coating 28 to produce a phase shift of approximately $\pi/2$ radians, the interferogram beams G,I will be in approximate phase quadrature.

In addition to altering the phase difference between the two interferogram beams G,I, in order to realise optimum contrast in the interferograms, the reflected and transmitted intensities produced by the coating 28 on the beam splitter block 22 each time a beam is split should be generally equal. It has been realised that, if the beam splitting coating 28 produces a phase shift of $\pi/2$ radians, then this requirement is also met.

Figure 3:
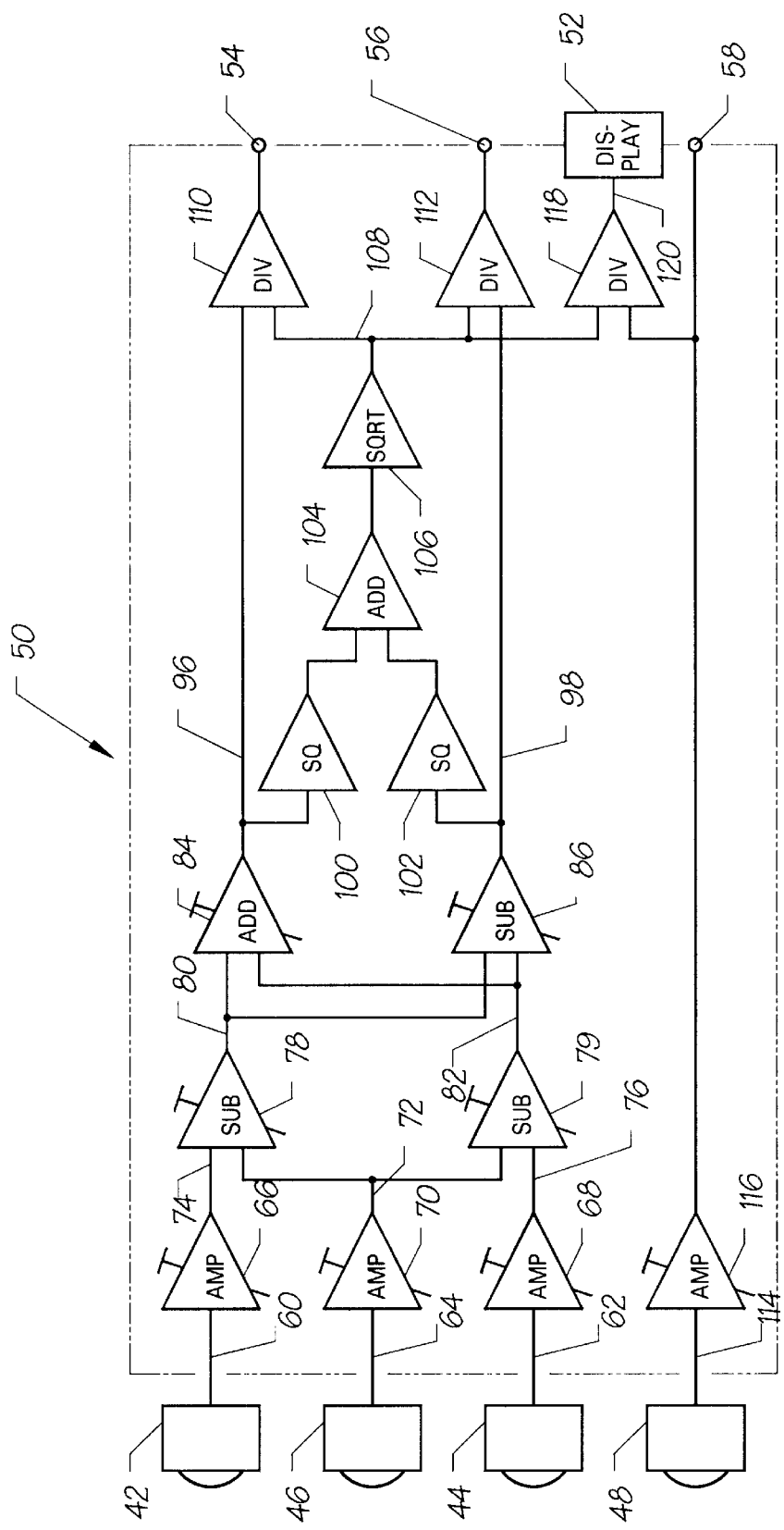
FIG. 3 is a block circuit diagram of a signal processing circuit forming part of the interferometer of FIG. 1.

In view of the above, and referring also to FIG. 3, the output signals $V_{60}, V_{62}, V_{64}$ from the interferogram photodetectors 42,44 and the DC reference photodetector 46 can be written as:

$$V_{64}=d;$$

$$V_{60}=(1+e_2).[d+a.(1+e_3).\sin(4\pi L/\lambda+e_1/2-\pi 4)]; \text{ and}$$

$$V_{62}=(1+e_4).[d+a.(1+e_5).\cos(4\pi L/\lambda-e_1/2-\pi/4)],$$

where: d is the DC level of the reference signal from the DC reference photodetector 46; a is the general AC amplitude of the signals from the interferogram photodetectors 42,44; L is the position of the movable, smaller retroreflector 34 along the longitudinal axis 12 relative to a convenient datum point, which introduces the common $-\pi/4$ term into the equations for $V_{60}, V_{62}$; $e_1$ is an error term to take account of the signals $V_{62}, V_{64}$ from the interferogram photodetectors 42,44 not being exactly in phase quadrature; and $e_2$ to $e_5$ are error terms to take account of differences in the AC amplitudes and DC levels of the signals $V_{62}, V_{64}$ from the interferogram photodetectors 42,44.

The photodetector signals $V_{60}, V_{62}, V_{64}$ are fed to respective preamplifiers 66,68,70. Preamplifier 70 has a gain of p. Preamplifiers 66,68 have gains which are set during initial calibration of the apparatus to $1/(1+e_2)$ and $1/(1+e_4)$, respectively. The outputs $V_{72}, V_{74}, V_{76}$ from the preamplifiers 70,66,68 are therefore:

$$V_{72}=p.d;$$

$$V_{74}=p.[d+a.(1+e_3).\sin(4\pi L/\lambda+e_1/2-\pi 4)]; \text{ and}$$

$$V_{76}=p.[d+a.(1+e_5).\cos(4\pi L/\lambda-e_1/2-\pi/4)],$$

The output $V_{72}$ of reference amplifier 70 is subtracted from the outputs $V_{74}, V_{76}$ of amplifiers 66,68 respectively by respective subtractor circuits 78,79 having gains which are set during initial calibration of the apparatus to $1/(1+e_3)$ and $1/(1+e_5)$, respectively to produce respective signals $V_{80}, V_{82}$ such that:

$$V_{80}=a.p.\sin(4\pi L/\lambda+e_1/2-\pi/4) \text{ and}$$

$$V_{82}=a.p.\cos(4\pi L/\lambda-e_1/2-\pi/4).$$

The signals $V_{80}, V_{82}$ are added by an adding circuit 84 and subtracted by a subtracting circuit 86 to produce respective signals $V_{96}, V_{98}$. The circuits 84,86 have their gains set during initial calibration of the apparatus as $1/\{2.\cos(e_1/2-\pi/4)\}$ and $1/\{2.\sin(e_1/2-\pi/4)\}$, so that the signals $V_{96}, V_{98}$ are:

$$V_{96} = a.p. \sin(4\pi L/\lambda) \text{ and}$$

$$V_{98} = a.p. \cos(4\pi L/\lambda).$$

It will be noted therefore that the signals $V_{96}, V_{98}$ have become independent of the values $e_1$ to $e_5$.

The root of the sum of the squares of the signals $V_{96}, V_{98}$ is determined by respective squaring circuits 100,102, adding circuit 104 and square-root circuit 106 to produce a signal $V_{108}$ such that:

$$V_{108} = a.p.$$

The signals $V_{96}, V_{98}$ are divided by the signal $V_{108}$ by respective divider circuits 110,112 to produce sine and cosine output signals $V_{54}, V_{56}$ respectively at the sine and cosine outputs 54,56 respectively, such that:

$$V_{54} = \sin(4\pi L/\lambda) \text{ and}$$

$$V_{56} = \cos(4\pi L/\lambda)$$

It will therefore be seen that the output signals $V_{54}, V_{56}$:

are complementary sine and cosine signals (i.e. having a phase difference of $\pi/2$) despite the coating 28 not necessarily producing a phase shift of exactly $\pi/2$;

have no DC offset;

have amplitudes normalised to unity; and are dependent merely upon:

the position L of the movable, smaller retroreflector 34 along the longitudinal axis 12 relative to the datum point; and the laser wavelength $\lambda$.

The output signals $V_{54}, V_{56}$ therefore provide excellent input signals for conventional interferometer reversible fringe counting apparatus and fringe subdividing apparatus which may be provided as dedicated hardware or as a programmed computer. Merely using phase quadrature fringe counting, the interferometer 10 can be used to measure displacements in the position L to an accuracy of $\lambda/8$ (80 nm). Furthermore, using known fringe subdivision techniques based on the arctangent of $V_{54}/V_{56}$, it is possible to measure displacement in L to far greater accuracy. In a prototype of the invention, accuracies of better than 5 nm in linearity in the measured displacement were readily achievable.

In FIG. 3, the signal $V_{114}$ from the laser intensity photodetector 48 represents the intensity i of the laser beam A before travelling to and returning from the reflector arrangement 16 and is supplied to a preamplifier 116 having a gain of p to produce the laser intensity signal $V_{58} = i.p$. This signal $V_{58}$ and the output signal $V_{108} = a.p$ from the square-root circuit 106 are also supplied to a divider circuit 118 which produces a DC signal $V_{120} = a/i$ which is proportional to fringe contrast and which is supplied to the display 52. The display 52 therefore represents the fringe contrast as a proportion of the laser beam intensity and greatly facilitates the user in aligning the retroreflectors 32,34 with the head module 14 when the interferometer 10 is set up so that the components of the interferogram beams G,I are superposed.

In addition to, or instead of, the normalised sine and cosine outputs 54,56, the signal processing circuit may provide the outputs 96,98 from the adder and subtractor circuits 84,86 as unnormalised sine and cosine outputs and/or these signal after they have been processed by a square-wave-shaping circuit.

Although the signal processing has been described above as being implemented by a dedicated circuit 50, it may alternatively be provided by respective analogue-to-digital converters for each of the photodetectors 42,44,46,48 which supply respective digital signals $D_{42}, D_{44}, D_{46}, D_{48}$ to respective input ports of a computer which is programmed to perform calculations corresponding to those set out above, and also to count the fringes where high-speed counting is required, it may be necessary to install a reversible counting card to the computer.

If the interferometer 10 described above were perfectly calibrated and operated perfectly, the output signals from the sine and cosine outputs 54,56 would be of equal amplitude and in exact phase quadrature with zero volt mean DC levels. If these signals were therefore fed as the X and Y signals to an oscilloscope, the oscilloscope trace would be a perfect circle upon movement of the reflectors 32,34 relative to each other. If the signals were not perfect so that a non-circular Lissajous figure were produced, compensation may be made, for example using computer software, so that a perfect circle would be obtained, and the compensation parameters could then be applied to the signals from the sine and cosine outputs 54,56 during use of the interferometer 10. In this case, it is expected that an accuracy of better than 1 nm in linearity would be possible where the metrology application merited it. In order to avoid the need to move the reflectors 32,34 while calculating the compensation parameters, the optical path length of the projected beam M and/or its return beam N, or of the projected beam C and/or its return beam D, may be modulated, preferably over at least one fringe.

Figure 4:
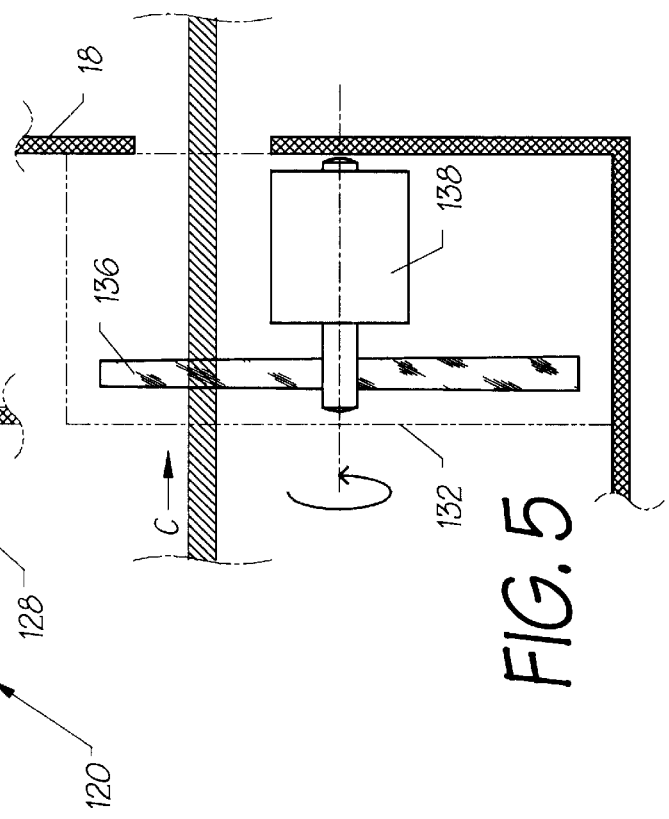
FIG. 4 is a sectioned side view of a first type of modulator module for use with the interferometer of FIG. 1.

In order to provide such modulation, a modulator module 120, as shown in FIG. 4 may be fitted in the interferometer module 14 in the region indicated by the phantom lines 122 in FIG. 1 so as to fall in the paths of the beams M,N to and from the movable retroreflector 34. The modulator module 120 comprises a pair of parallel silica discs 124,126 in between which an annulus 128 of piezo electric material (or an annular piezo electric stack) is sandwiched and cemented. The cavity within the piezo electric annulus 128 and between the disks 124,126 is completely filled with silicone rubber 130 which is allowed to cure at room temperature. Upon application of a modulating voltage to the piezo electric annulus 128, the spacing between the silica discs 124, 126 is modulated, and accordingly the thickness of the silicone rubber 130 is modulated so as to modulate the optical path length of the beam M and also the beam N.

Figure 5:
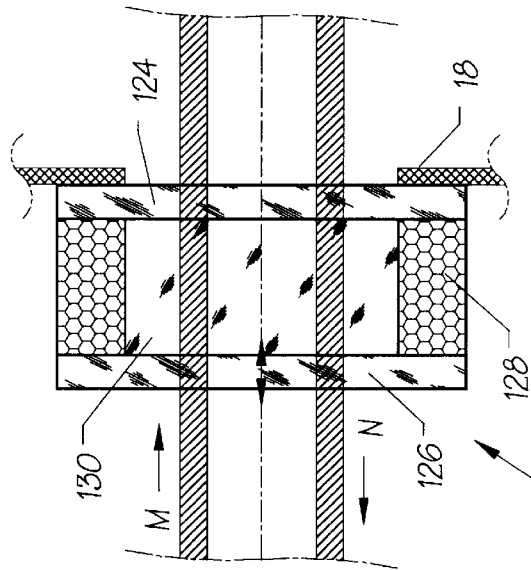
FIG. 5 is a sectioned side view of a second type of modulator module for use with the interferometer of FIG. 1.

An alternative modulator module 132 is illustrated in FIG. 5 and may be fitted in the interferometer head module 14 in the region indicated by the phantom lines 134 in FIG. 1 so as to fall in the path of the beam C to the reference retroreflector 32. The modulator module 132 comprises a disc 136 of silica, the thickness of which progressively varies from a maximum at one point on the periphery of the disc 136 to a minimum at a diametrically opposite point on the periphery of the disc 136. The disc 136 is mounted coaxially on the shaft of an electric motor 138. When the motor 138 is driven, the disc 136 rotates about its axis, and so the optical path length of the beam C is modulated.

Figure 6:
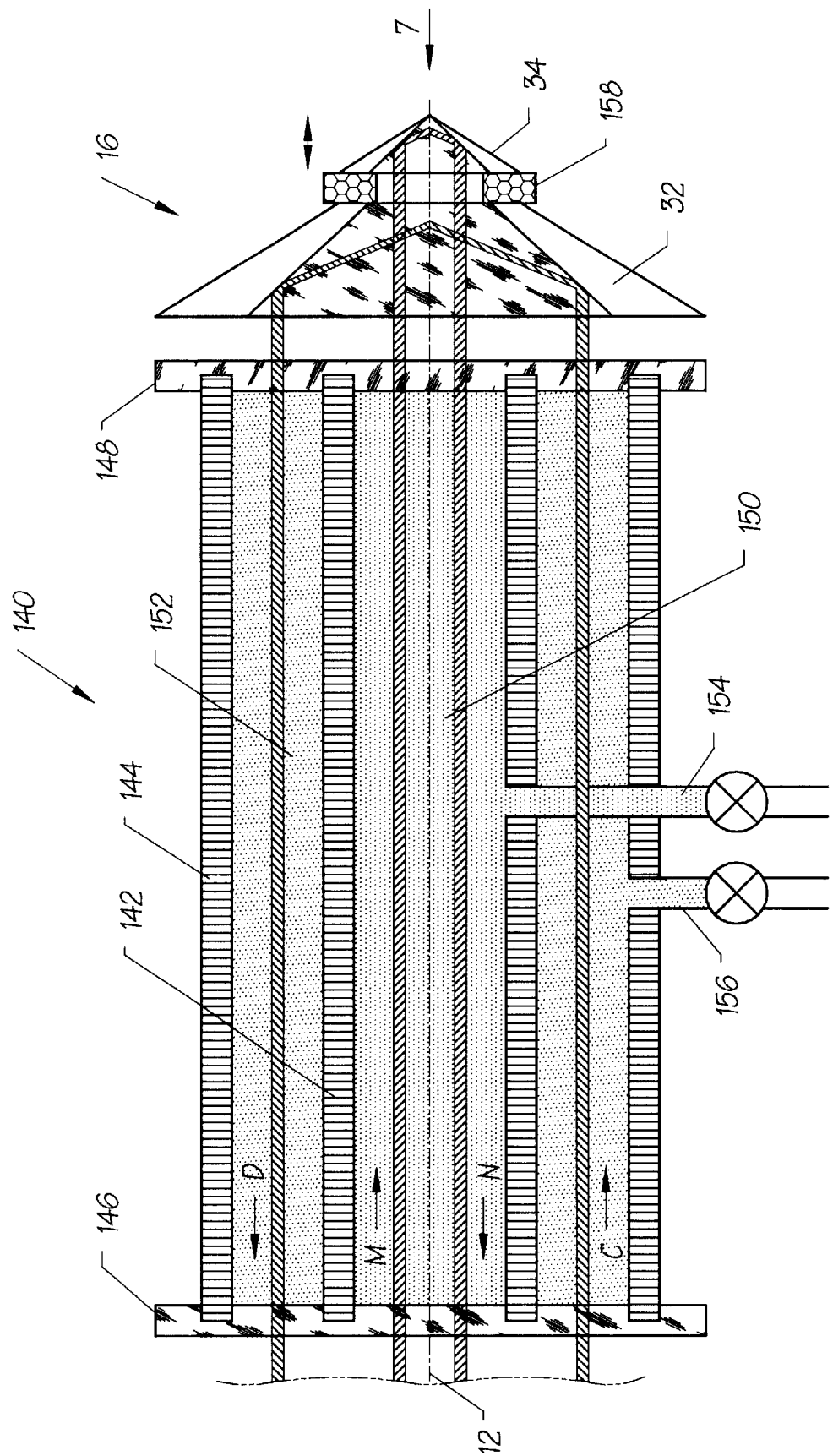
FIG. 6 is a sectioned side view of a second type of reflector/modulator module and a gas refractometer module for use with the interferometer head of FIG. 1, sectioned on the line 6—6 shown in FIG. 7.

The interferometer 10 of FIG. 1 may be used in conjunction with a gas or liquid refractometer module 140, as shown in FIGS. 6 and 7, disposed between the interferometer head module 14 and the reflector arrangement 16. The refractometer module 140 comprises a pair of coaxial cylinders 142,144 sandwiched between and cemented to a pair of circular silica windows 146,148 so as to form an inner cylindrical chamber 150 and, coaxially therewith, an outer annular chamber 152. The beams C,D pass through the outer annular chamber 152, and the beams M,N pass through the inner cylindrical chamber 150. The chambers 150, 152 can be filled with, and emptied of, any desired gas or liquid via respective valved ports 154,156. For flow-through configurations, the ports 154,156 may be provided in pairs. For further description of such a refractometer *per se*, reference is directed to FIG. 16a of patent document US-A-5546184, and the description thereof, which are incorporated herein by reference.

Still referring to FIGS. 6 and 7, in order to provide more convenient modulation when the refractometer module 140 is used, a reflector module 16 may be employed which is similar to that described above with reference to FIGS. 1 and 2, except that an annulus 158 of piezo electric material (or an annular piezo electric stack) is sandwiched between and cemented to the larger truncated cube corner reflector 32 and the smaller cube corner reflector 34. Upon application of a modulating voltage to the piezo electric annulus 158, the spacing between the reflectors 32, 34 is modulated so as to modulate the optical path length of the beam M and also the beam N. In the arrangement of FIGS. 6 and 7, the reflector module 16 may be cemented to the plate 148, rather than being spaced therefrom.

A modified form of the signal processing circuit 50 of FIG. 3 may be used when the refractometer module 140 is employed, in which the output signal 72 from the DC return-intensity amplifier 70 is divided by the output signal 58 from the DC projected-intensity amplifier 116 to provide a measure of the optical absorption of the gas or liquid in the refractometer module 140, and in which these two output signals 72,58 are also used to correct the DC levels of the output signals 74,76 from the interferogram amplifiers 60,62 to take account of the absorption.

In the arrangement of FIGS. 1 and 2, the interferometer 10 is used to measure movement of the reflector 34 in the direction of the optical axis 12 relative to the reflector 32 and is substantially insensitive, within limits, to relative movement of the reflectors 32,34 in directions orthogonal to the optical axis 12 or tilting of the reflectors 32,34. By contrast, FIGS. 8 and 9 illustrate a reflector module 160 for measuring tilt about an axis 162 orthogonal to the plane containing the beams C,D,M,N and which is substantially insensitive to translational movement of the reflector module 160. In FIGS. 8 and 9, a pair of identical cube corner retroreflectors 164,166 are cemented by their faces to an apertured base plate 168. It should be noted that, in the case of the reflector module 160, the beam N is produced by reflection of the beam C by the cube corner reflector 166, and the beam D is produced by reflection of the beam M by the cube corner reflector 164. Nevertheless, when used in conjunction with the interferometer head module 14 of FIG. 1 and with appropriate positioning of the reflectors 154,166 on the base plate 168, this arrangement still produces a pair of interferogram beams G, I in phase quadrature. It will be appreciated that, when the base plate 168 is tilted about the axis 162, a difference in optical path length between the beams C,N, on the one hand, and the beams M,D, on the other hand, is produced which is directly proportional to the amount of tilt.

FIGS. 10 and 11 illustrate a further type of reflector arrangement 170. This arrangement 170 is similar to the reflector arrangement 16 shown in FIGS. 1 and 2, except that a convex lens 172 is cemented to the truncated face of the truncated cube corner reflector 32, and a plane mirror 174 is employed instead of the smaller cube corner reflector 34. The reflector arrangement 170 is useful for measuring vibration of the plane mirror 174 relative to the reflector 32 and lens 172. Depending upon the numerical aperture of the lens 172, a small cosine-error correction is required with this module.

Figure 12:
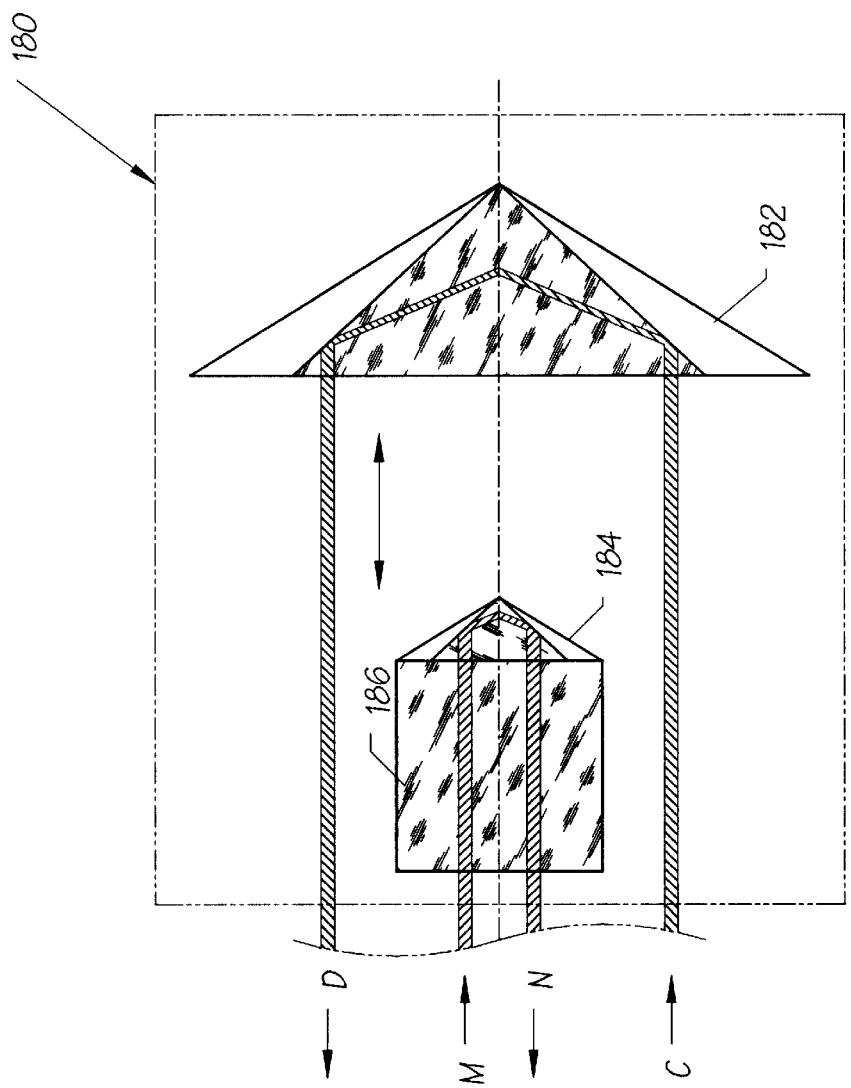
FIG. 12 is a sectioned side view of a fifth type of reflector module for use with the head module of FIG. 1.

FIG. 12 illustrates another type of reflector arrangement 180, in which the beam C is reflected by a complete cube corner reflector 182 to produce the beam D, and in which the beam M is reflected by a smaller, complete cube corner reflector 184 to produce the beam N, the smaller reflector 184 being nearer the interferometer head module 14 (not shown) than the larger reflector 182. In this case, a silica block 186 may be cemented to the face of the smaller reflector 184 so that the optical path length through silica is the same for the beams M,N as for the beams C,D. Alternatively, the block 186 may be separate from the reflector 184 and indeed may be mounted in the region 122 in the head module 14.

Figure 14:
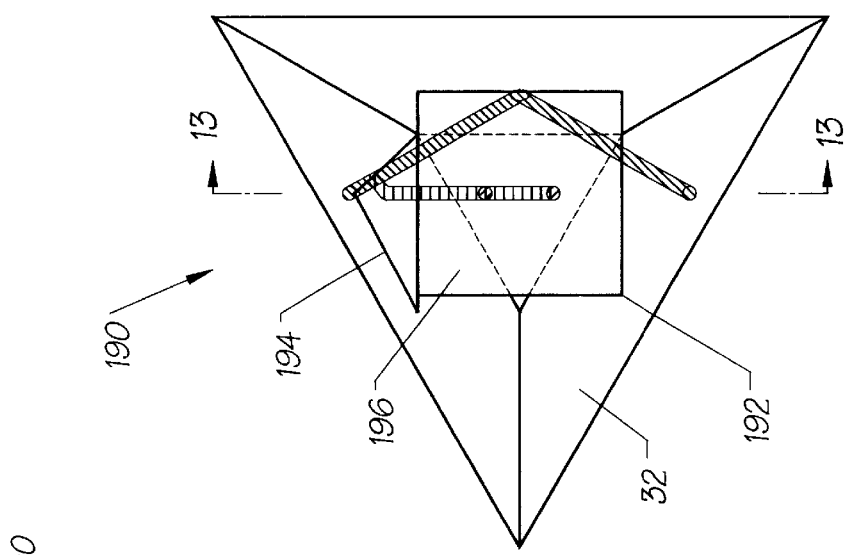
FIG. 14 is an end view of part of the sixth type of reflector module, as viewed in the direction of the arrows 14—14 shown in FIG. 13.
Figure 13:
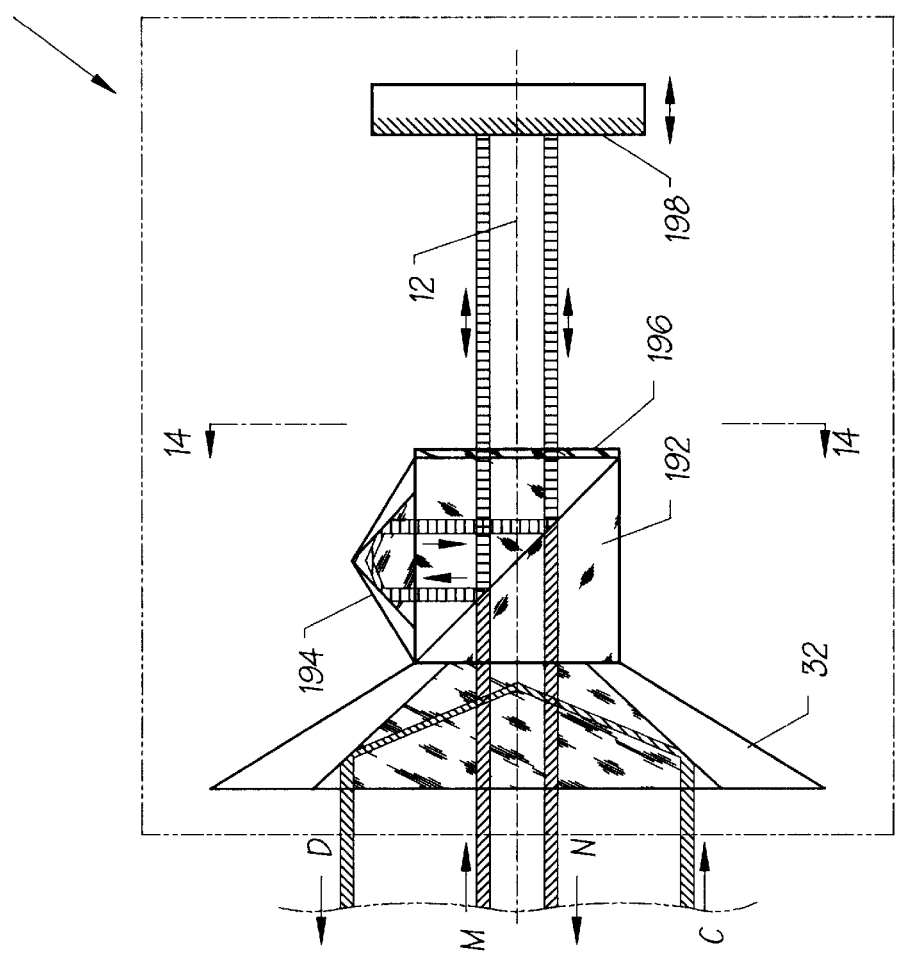
FIG. 13 is a side view of a sixth type of reflector module for use with the head module of FIG. 1, sectioned along the line 13—13 shown in FIG. 14.

FIGS. 13 and 14 illustrate yet another type of reflector arrangement 190 employing a truncated cube corner retroreflector 32. A polarising beam splitting block 192 is cemented to the truncated face of the retroreflector 32, and a quarter wave retardation plate is cemented to the opposite face of the polarising beam splitting block 192 with its axis at 45° to the plane of the paper. A further, smaller cube corner retroreflector 194 is cemented to one of the side faces of the polarising beam splitting block 192. A plane mirror 198 is disposed on the optical axis 12. As in the arrangement of FIG. 1, the beam C is reflected by the truncated retroreflector 32 to produce the return beam D. In the case of the beam M, it is transmitted through the reflector 32 and through the beam splitting block 192 to the mirror 198. Upon reflection, the beam is reflected by the beam splitting block 192 to the retroreflector 194. Upon reflection, the beam is reflected by the beam splitting block 192 towards the mirror 198. Upon reflection, the beam passes through the beam splitting block 192 and the truncated retroreflector 32 to form the return beam N. The beam splitting block 192, retroreflector 194 and quarter wave plate 196 make the mirror 198 tilt-insensitive, and the sensitivity of the arrangement to movement of the mirror 198 in the direction of the optical axis 12 relative to the other parts of the reflector arrangement is enhanced by the double pass of the mirror 198. In the case of the reflector arrangement 190, for complete efficiency and to prevent light being reflected back into the laser cavity, the beam M should be polarised in the plane of the paper.

As mentioned above, the coating 28 on the block 22 needs to produce particular characteristics regarding phase shift and relative intensities of transmitted and reflected light. Such coatings are known in the context of Michelson interferometers and are described in Raine K W and Downs M J, 1978, *Optica Acta*, Vol 25, No 7, pp 549–558 and also Vyskub VG, et al, 1977, *Pribory i Tekhnika Eksperimenta*, (Moscow Engineering Physics Institute), No 4, pp 210–211, the contents of which are incorporated herein by reference. For example, the former paper describes a nickel:chromium coating applied by evaporation from an 80:20 nickel:chromium coated tungsten filament and producing a phase shift of about 90°. This paper also describes double-and triple-layer films of aluminium and chromium, aluminium and nickel, gold and chromium, and chromium, gold and chromium, the best results being obtained with a 4 nm base layer of chromium, 16 nm intermediate layer of gold and 5 nm outer layer of chromium. The latter paper describes an oxidised aluminium coating. Aluminium is deposited to a thickness of 16 nm to provide an initial phase shift in transmitted light of 110±3° and then oxidised by heating in air to a maximum temperature of 470° C. and then allowing to cool to provide a phase shift of 90±3°. An improved method of applying this latter type of coating will now be described with reference to FIG. 15.

In FIG. 15, an oven 200 has a housing 202 with a door 204, and a heating element 206 with a thermostatic controller which can maintain the oven temperature between 450 and 480° C. A coated beam splitter block 22 can be placed in the housing 202. The housing has a first window 208 through which a beam of light Q can be projected from a helium neon laser 209 so as to impinge on the coating 28 on one side of the block about half-way along the length of the coating at an angle of incidence of 45°. The light Q is conveniently circularly polarised, or plane polarised at an angle of 45° to the P and S directions of the surface. At the coating 28, a reflected beam R is produced which passes through a second window 210 to a 'reflectance' photodetector 212. The transmitted refracted beam T is transmitted and refracted at the other side of the block 22 and passes through a third window 214 to a 'transmittance' photodetector 216. The photodetectors 212,216 provide signals to respective amplifiers 218,220 of generally equal gain, and the outputs of the amplifiers 218,220 are connected to a comparator 222.

The method of applying the coatings 26,28 to the block 22 and treating the coating includes the following steps:

1. Using a single edged mask, aluminium is deposited on about 60% of one side of the block 22 to a thickness of about 16 nm to form the coating 28. (After the initial coating, the coating provides a transmittance of between 10 and 12%.)
2. The block is rotated through half a turn, and, using the same mask, aluminium is deposited on about 60% of the opposite side of the block 22 to a thickness of about 16 nm to form the coating 26.
3. The coated block 22 is placed in the oven 200, the door 204 is closed, and the heating element 206 is switched on to raise the temperature in the oven to between 450 and 480° C.
4. The beam of light Q is projected at the coating 28 on the block 22 as described above. Initially, the comparator 22 indicates that the intensity of the reflected beam R is greater than the intensity of the transmitted beam T.
5. As the temperature of the block 22 and coating 28 increases, and with time, the aluminium of the coating 28 oxidises non-homogeneously. The intensity of the reflected beam R decreases, and the intensity of the transmitted beam T increases.
6. When the comparator 22 indicates that the intensity of the reflected beam R is equal to the intensity of the transmitted beam T, the heating element 206 is switched off, and the door 204 is opened so that the block 22 and coating 28 immediately begin to cool.
7. The treated, coated block 22 is then removed from the oven 200.

It has been discovered that, when the transmittance and reflectance at the coating 28 are equal, the phase shift produced by the coating 28 between the two interferograms G,I when the block is used in the interferometer 10 is π/2 radians.

In one form of the method described above, the reflectance photodetector 212 and its amplifier 218 have the same gain as the transmittance photodetector 216 and its amplifier 220. However, it will be noted that the transmitted beam T is refracted at the side of the block 22 opposite the coating 28, and there is a reflection loss at this surface of typically 3.5%. Therefore in another form of the method, the reflectance photodetector 212 and its amplifier 218 are set to have a gain of 96.5% of the gain of the transmittance photodetector 216 and its amplifier 220. Also, it will be appreciated that, once the heating element 206 is switched off and the door 204 is opened in step 6 above, the coating 28 may continue to oxidise slightly more while the block 22 and coating 28 cool down. Therefore, in a further form of the method, the gain of the transmittance amplifier 216 may be increased slightly relative to the gain of the reflectance amplifier 218 to take account of this overshoot.

A method of manufacture of the truncated cube corner reflector 32 and its associated smaller cube corner reflector 34 (as used in the arrangements of FIGS. 1, 2, 6, 7, 13 and 14) will now be described with reference to FIGS. 16A–E. Starting with a complete solid cube corner reflector 230 as shown in FIG. 16A, the reflector 230 is cut into two using a diamond saw through the plane 232. The cutting plane 232 is parallel to, or very slightly inclined relative to, the front face 30 of the reflector 230, and the cutting plane 232 is disposed about two-thirds of the way from the front face of the reflector 230 to its apex 234. The cut face 38 of the larger cut part, which forms the truncated reflector 32 as shown in FIGS. 16B,C, is polished. The cut face 36 of the smaller cut part, which forms the smaller reflector 34 as shown in FIGS. 16D,E, is polished and treated with an anti-reflection coating as required.

A method of manufacturing an alternative pair of retroreflectors 240,242 which may be used in place of the reflectors 32,34 in the arrangements of FIGS. 1, 2, 6, 7, 13 and 14 will now be described with reference to FIGS. 17A–G. In this case, the reflectors 240,242 are hollow, rather than solid, cube corner reflectors. The reflectors 240,242 are made from three mirrors 244, one of which is shown in FIG. 17A. Each mirror 244 has the shape of an isosceles right-angled triangle, and the shorter two edges 246,248 are bevelled outwardly at an angle of 45° away from the reflective surface 250. Each mirror 244 is cut into two using a diamond saw through the plane 252. The cutting plane 252 is parallel to the hypotenuse of the mirror 244 and is disposed about two-thirds of the way from the hypotenuse of the mirror 244 to the opposite vertex of the reflective surface 250. Each mirror 244 therefore produces a larger, truncated triangular mirror 254 as shown in FIG. 17B and a smaller triangular mirror 256 as shown in FIG. 17C. The three larger mirrors 254 are then cemented together with the bevelled edge 246 of each being joined to the bevelled edge 248 of another, so as to form the truncated, hollow, cube corner retroreflector 240 as shown in FIGS. 17D,E. Similarly, the three smaller mirrors 256 are cemented together with the bevelled edge 246 of each being joined to the bevelled edge 248 of another, so as to form the smaller, complete, hollow, cube corner retroreflector 242 as shown in FIGS. 17F,G. Precise alignment of these reflecting surfaces is preferably realised by examining the retroreflector during assembly on a Fizeau interferometer.

It should be noted that each mirror 244 does not need to be a complete triangle. For example, the portions of the mirror adjacent the vertices at the ends of the hypotenuse may be omitted, and indeed the mirrors 244 may be square. Furthermore, the cut 252 does not need to be straight. The mirror 244 should, however, have the edges 246,248 at right angles to each other.

A modification to the auto-collimation reflector module of FIGS. 8 and 9 will now be described with reference to FIGS.

18 and 19. In FIGS. 18 and 19, the three apices of each reflector 164,166 at the corners of its front face have been rounded off, as indicated by reference numeral 167. Furthermore, the reflector 166 has been rotated through half a turn, as viewed in FIG. 19 compared with FIG. 9.

A modification of the reflector 32 as shown in FIGS. 1, 2, 6, 7, 10, 11, 13 and 14 will now be described with reference to FIGS. 20 and 21. In FIGS. 20 and 21, the three apices of the reflector 32 at the corners of its front face have been rounded off, as indicated by reference numeral 35. Furthermore, rather than being truncated by cutting off the central apex of the reflector, the reflector 32 of FIGS. 20 and 21 has a hole 33 formed through it coaxial with the optical axis 12. In use, the beam C is retroreflected by the reflector 32 in the manner described above to produce the beam D. However, the beams M,N pass through the hole 33 unimpeded by the reflector 32. It should be noted that the hole 33 substantially restricts the aperture of the reflector 32 so as to exclude the areas indicated by horizontal hatching 37 in FIG. 20.

The reflector 32 of FIGS. 20 and 21 may be manufactured by boring the hole 33 though a solid cube corner reflector and by rounding off the apices as at 35. If desired, the spikes produced at the rear end of the hole 33 may be removed.

In another modification of the reflector arrangement 16 shown in FIG. 1, the retroreflectors 32,34 are connected by a mechanical linkage which retains the retroreflectors 32,34 in alignment on their optical axis but which permits movement of the retroreflectors 32,34 towards and away from each other, and a probe is attached to the smaller retroreflector 34 for abutment with a surface whose displacement is to be measured.

It will be appreciated that a number of improvements to a Jamin-type interferometer 10 have been described above. Additionally, the interferometer 10 is modular, having a head module 14 that can be used with different types of laser, and a range of various reflector modules for displacement, vibration and tilt measurement. Additionally, a refractometer module and a variety of modulator modules may be employed.

It should be noted that the embodiments of the invention have been described above purely by way of example and that many other modifications and developments may be made thereto within the scope of the present invention.

What I claim is:

1. A reflector system comprising first and second relatively movable reflectors, wherein:
   the first reflector is a retroreflector having three mutually-orthogonal reflective surfaces arranged around an optical axis, wherein the reflective surfaces stop short of the optical axis to provide a central region of the retroreflector which transmits incident light and a peripheral region of the retroreflector which retroreflects incident light; and
   the reflectors are arranged so that light which is transmitted through the central region of the first reflector is reflected by the second reflector and transmitted back through the central region of the first reflector.

2. A system as claimed in claim 1, wherein the second reflector is a retroreflector.

3. A system as claimed in claim 2, wherein the second reflector has three mutually-orthogonal reflective surfaces arranged around a second optical axis.

4. A system as claimed in claim 3, wherein each of the reflective surfaces of the second reflector is arranged parallel to a respective one of the reflective surfaces of the first reflector.

5. A system claimed in claim 3, wherein the second reflector comprises a second body of optical material which provides the reflective surfaces by internal reflection in the second body.

6. A system as claimed in claim 5, wherein the second body has a transmitting surface for incident light which is generally, but not exactly, parallel to the second transmitting surface of the first reflector.

7. A system as claimed in claim 3, wherein the second reflector comprises three plane mirror elements arranged around the second optical axis.

8. A system as claimed in claim 1, wherein the first and second reflectors are joined by a piezo electric material.

9. A system as claimed in claim 1, wherein the second reflector comprises a plane mirror, the system further including a lens between the first and second reflectors.

10. A system as claimed in claim 1, wherein the second reflector comprises a polarizing beam splitter, quarter-wave retardation plate, plane mirror and second retroreflector arranged such that:
    light which is transmitted through the central region of the first reflector is transmitted through the beam splitter and quarter-wave plate to the mirror;
    the light which is thus reflected by the mirror is transmitted through the quarter-wave plate, is reflected by the beam splitter, and is directed to the second retroreflector;
    the light which is thus reflected by the retroreflector is reflected by the beam splitter and transmitted through the quarter-wave plate to the mirror; and
    the light which is thus reflected by the mirror is transmitted through the quarter-wave plate, the beam splitter and the central region of the first reflector.

11. A reflector system as claimed in claim 1, and forming part of a Jamin-type interferometer.

12. A reflector system as claimed in claim 1, in combination with a beam splitter, wherein:
    the beam splitter is arranged to split an incident beam of light into first and second generally-parallel, spaced-apart, projected beams;
    the reflector system is arranged to reflect the first and second projected beams to produce first and second return beams, respectively, which are spaced apart from and generally parallel to each other and the first and second projected beams; and
    the beam splitter is arranged to enable the first and second return beams to be superposed to produce at least one interferogram;
    so as to form a Jamin-type interferometer.

13. A reflector system as claimed in claim 12, wherein:
    the projected beams are projected from, and the return beams return to, a single face of the beam splitter; and
    one of the projected beams is disposed between the return beams and/or one of the return beams is disposed between the projected beams.

14. A reflector system as claimed in claim 13, wherein a first contiguous area of the face of the beam splitter is provided with a phase-shifting coating, one of the projected beams being projected from, and one of the return beams returning to, the first area.

15. A reflector system as claimed in claim 14, wherein the coating produces a phase shift such that there is a phase difference of substantially $\pi/2$ radians between the two interferogram beams.

16. A reflector system as claimed in claim 14, wherein the coating comprises a thin metal film.

17. A reflector system as claimed in claim 13, wherein a second contiguous area of the face of the beam splitter is devoid of any coating providing any substantial phase-shift, the other projected beam being projected from, and the other return beam returning to, the second area.

18. A reflector system as claimed in claim 12, further comprising a dual-chamber gas or liquid refractometer arranged so that the first projected and return beams pass through one chamber of the refractometer and the second projected and return beams pass through the other chamber of the refractometer.

19. A reflector system as claimed in claim 12, further including means for modulating the optical path length of one of the beams, or one of the projected beams and its respective return beam.

20. A reflector system as claimed in claim 19, wherein the modulating means comprises an optically-transmitting, varying-thickness plate disposed in the path of the beam(s) to be modulated, and means for rotating the plate.

21. A reflector system as claimed in claim 19, wherein the modulating means comprises a layer of optically-transmitting, flexible material sandwiched between a pair of optically-transmitting plates disposed in the path of the beam(s) to be modulated, and means for modulating the spacing of the plates.

22. A reflector system is claimed in claim 19, wherein the modulating means is disposed adjacent the beam splitter.

23. A reflector system as claimed in claim 1, wherein the first reflector comprises a body of optical material which provides the reflective surfaces by internal reflection in the body.

24. A reflector system as claimed in claim 23, wherein the first reflector is in the form of a solid cube corner having a first transmitting surface for incident light and a second transmitting surface which truncates the cube corner.

25. A reflector system as claimed in claim 24, and forming part of an optical apparatus having an optical axis, wherein the first transmitting surface is generally, but not exactly, orthogonal to the optical axis of the apparatus.

26. A reflector system as claimed in claim 24 wherein the first and second transmitting surfaces are generally, but not exactly, parallel.

27. A reflector system as claimed in claim 23, wherein the first reflector is in the form of a solid cube corner having a passageway extending therethrough generally in the direction of the optical axis of the first reflector to provide the central region.

28. A reflector system as claimed in claim 1, wherein the first reflector comprises three plane mirror elements arranged around the optical axis, each providing a respective one of the reflective surfaces.

29. A reflector system as claimed in claim 28, wherein the first reflector is in the form of a hollow truncated cube corner.

* * * * *